United States Patent
Brooks et al.

(10) Patent No.: US 6,749,267 B1
(45) Date of Patent: Jun. 15, 2004

(54) TRUCK BED DUMPING SYSTEM

(76) Inventors: Alvester Brooks, 241 D Boardwalk Ct, San Bruno, CA (US) 94066; Donna D. Sanderson, 241 D Boardwalk Ct, San Bruno, CA (US) 94066

( * ) Notice: Subject to any disclaimer, the term of this patent is extended or adjusted under 35 U.S.C. 154(b) by 22 days.

(21) Appl. No.: 10/194,867

(22) Filed: Jul. 12, 2002

(51) Int. Cl.[7] .................................................. B60P 1/00
(52) U.S. Cl. .................. 298/21 V; 298/22 F; 298/19 V
(58) Field of Search ............... 298/1 A, 22 F, 298/21 V, 15 V, 19 V; 296/183.2

(56) References Cited

U.S. PATENT DOCUMENTS

| | | | |
|---|---|---|---|
| 1,195,489 A | * | 8/1916 | Martin |
| 1,304,792 A | * | 5/1919 | Minton |
| 1,442,958 A | * | 1/1923 | Lynch |
| 1,451,127 A | * | 4/1923 | Thornton |
| 1,527,466 A | * | 2/1925 | Brown et al. |
| 1,607,734 A | * | 11/1926 | Fortini |
| 1,616,380 A | * | 2/1927 | Lucas |
| 1,766,157 A | * | 6/1930 | Weber et al. |
| 2,033,209 A | | 3/1936 | Teetor |
| 3,237,989 A | | 3/1966 | Fulton |
| 3,377,104 A | * | 4/1968 | Sherman |
| 3,411,825 A | | 11/1968 | Fulton |
| 3,826,534 A | | 7/1974 | Ruff |
| D335,267 S | | 5/1993 | Upshaw |
| 5,447,361 A | | 9/1995 | Phillips |

FOREIGN PATENT DOCUMENTS

| | | | | |
|---|---|---|---|---|
| GB | 002245230 | * | 1/1992 | ................ 298/19 V |
| JP | 362184941 | * | 8/1987 | ................ 298/19 V |

* cited by examiner

*Primary Examiner*—D. Glenn Dayoan
*Assistant Examiner*—H. Gutman

(57) ABSTRACT

A truck bed dumping system for converting a vehicle has a bed positioned behind a cab of the vehicle into a dump truck. The system includes a support structure that has at least one pulley attached to the top end. A coupler is fixedly coupled to the forward section of the bed of the vehicle. A pair of support members is fixedly coupled to a bottom surface of a rear section of the bed making the bed pivotable. A winch is fixedly coupled to the frame of the vehicle and positioned adjacent the bottom end of the support structure. A cable for raising and lowering the forward section of the bed is wound about the winch and abuts the pulleys. The winch moves the bed between the raised and lowered positions. An actuator for controlling the winch is positioned in the cab of the vehicle.

11 Claims, 4 Drawing Sheets

TRUCK BED DUMPING SYSTEM

BACKGROUND OF THE INVENTION

1. Field of the Invention

The present invention relates to truck bed dumping systems and more particularly pertains to a new truck bed dumping system for converting a vehicle having a bed positioned behind a cab of the vehicle into a dump truck.

2. Description of the Prior Art

The use of truck bed dumping systems is known in the prior art. U.S. Pat. No. 5,447,361 describes a portable dumping insert for a pickup truck. Another type of truck bed dumping systems is U.S. Pat. No. 3,826,534 having a dump body for a pickup truck.

While these devices fulfill their respective, particular objectives and requirements, the need remains for a system that converts a truck having a standard fixed bed into a dump truck.

SUMMARY OF THE INVENTION

The present invention meets the needs presented above by making the fixed bed pivotable, and incorporating a winch with a pulley assembly on a frame that is attached to the front section of the bed.

Still yet another object of the present invention is to provide a new truck bed dumping system that can utilize an existing winch on a vehicle.

To this end, the present invention generally comprises a support structure that has at least one pulley attached to the top end. A coupler is fixedly coupled to the forward section of the bed of the vehicle. A pair of support members is fixedly coupled to a bottom surface of a rear section of the bed making the bed pivotable. A winch is fixedly coupled to the frame of the vehicle and positioned adjacent the bottom end of the support structure. A cable for raising and lowering the forward section of the bed is wound about the winch and abuts the pulleys. The winch moves the bed between the raised and lowered positions.

An actuator for controlling the winch is positioned in the cab of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
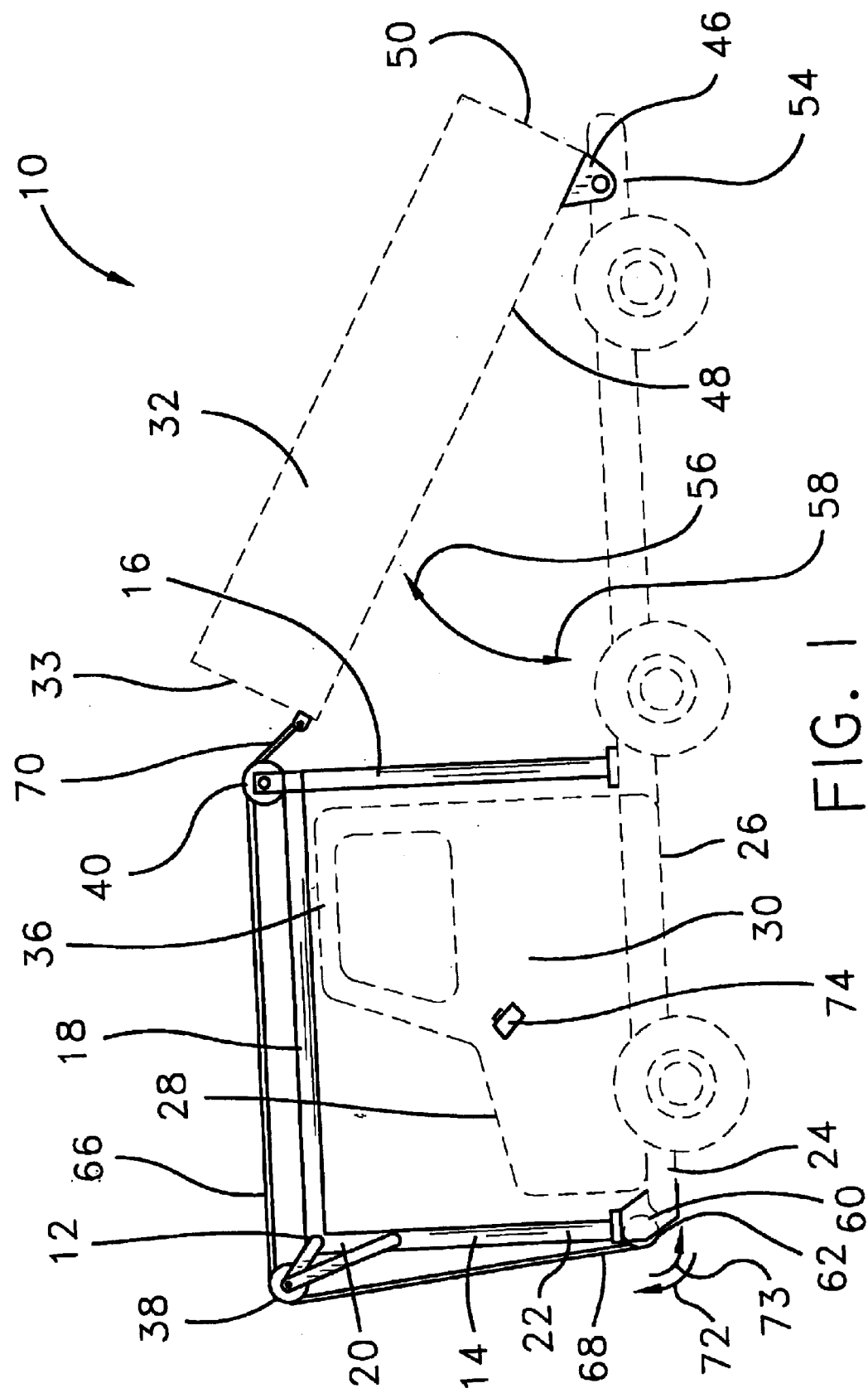
FIG. 1 is a schematic side view of a new truck bed dumping system of the preferred embodiment according to the present invention.
Figure 2:
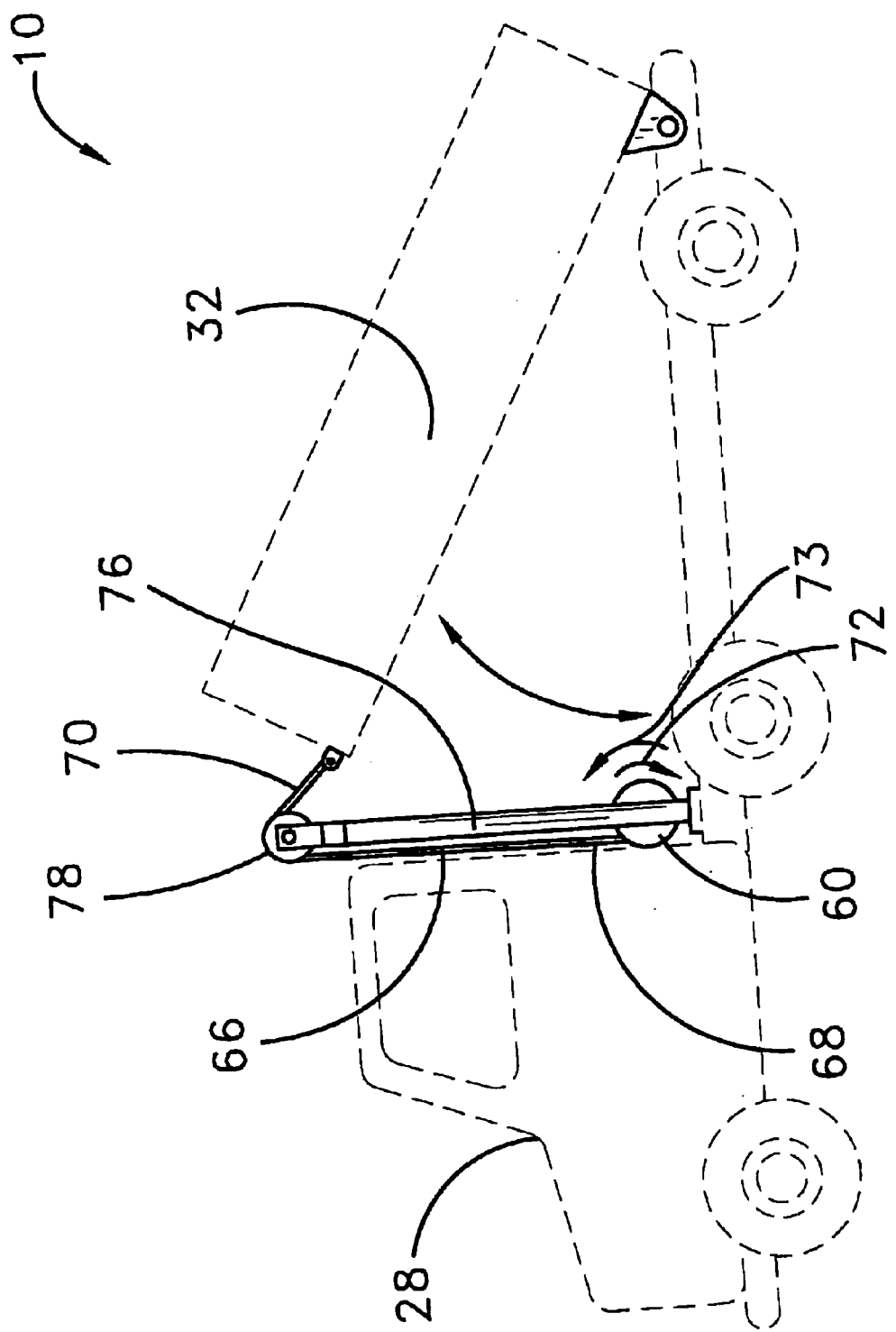
FIG. 2 is a schematic side view of the secondary embodiment of the present invention.
Figure 3:
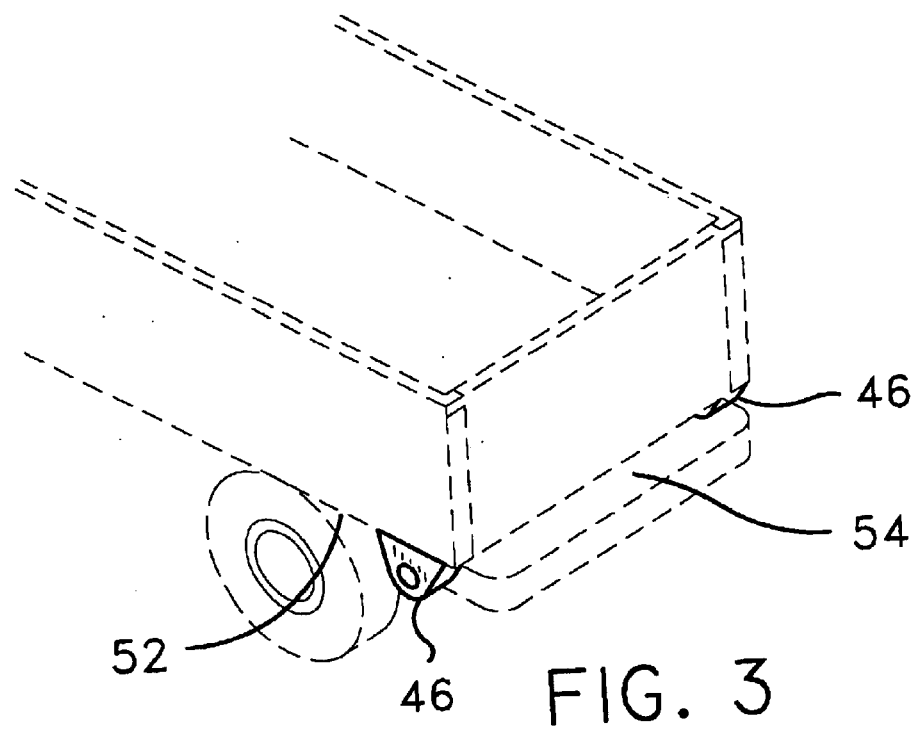
FIG. 3 is a schematic perspective view of the rear portion of the vehicle of the present invention.
Figure 4:
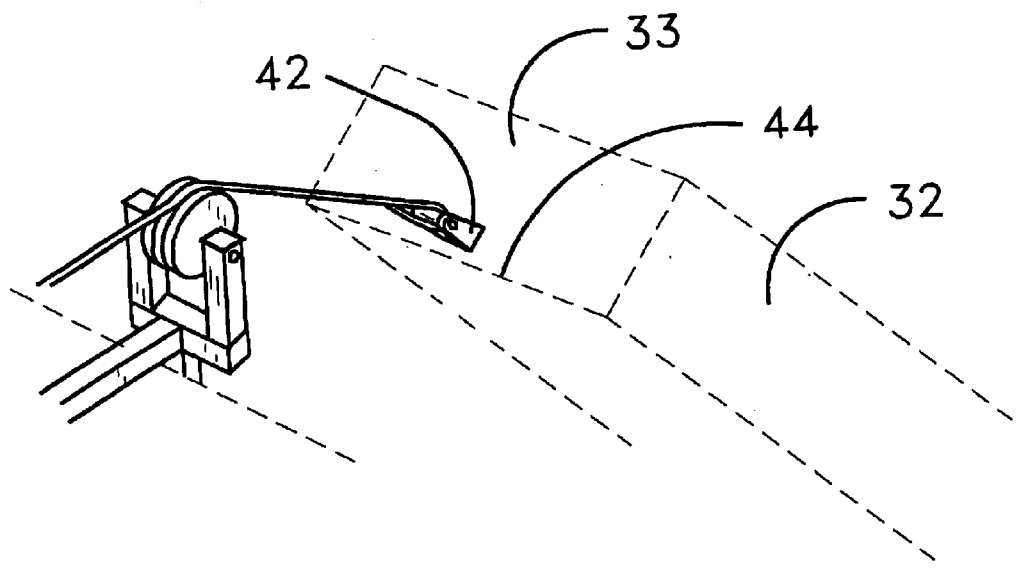
FIG. 4 is a schematic perspective view of the front section of the bed of the vehicle in the raised position.
Figure 5:
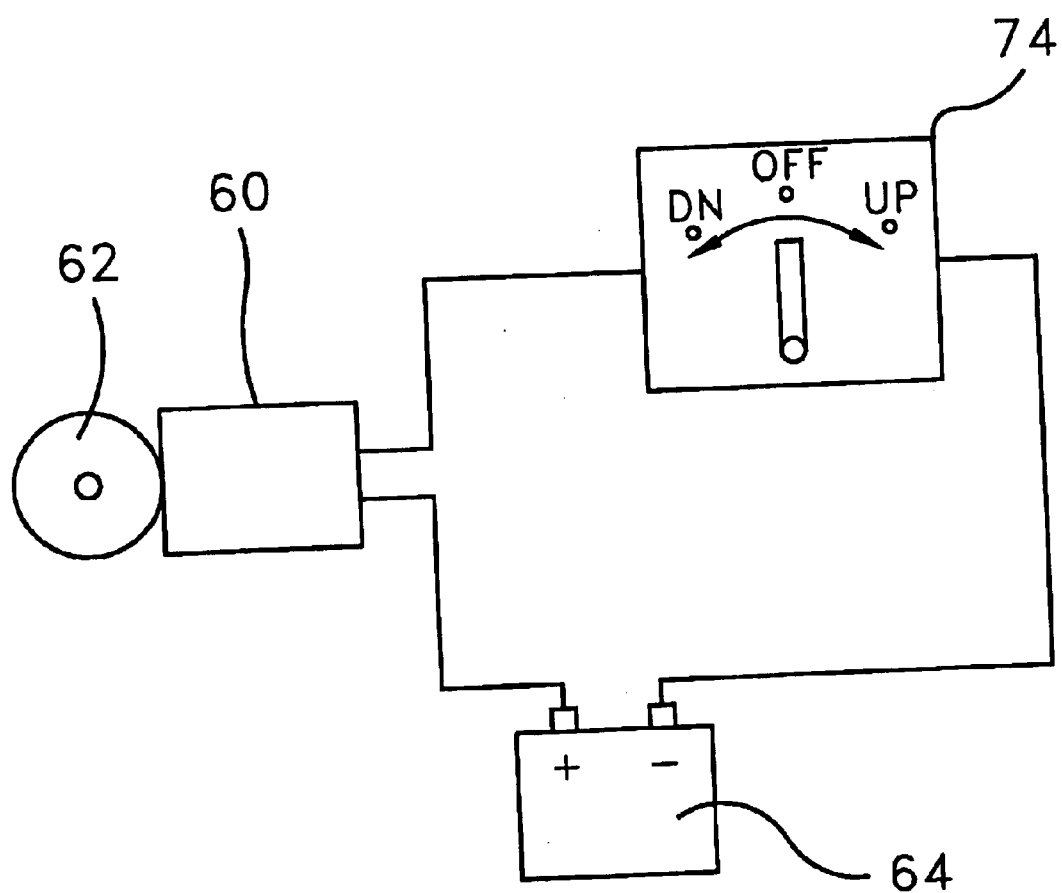
FIG. 5 is a electrical schematic of the present invention.

With reference now to the drawings, and in particular to FIGS. 1 through 5 thereof, a new truck bed dumping system embodying the principles and concepts of the present invention and generally designated by the reference numeral 10 will be described.

As best illustrated in FIGS. 1 through 5, the truck bed dumping system 10 generally comprises a support structure 12 that has a front bar 14, a rear bar 16, and a top bar 18. Each of the front and rear bars 14, 16 has a top end 20 and a bottom end 22.

The bottom end 22 of the front bar 14 is fixedly coupled to a front portion 24 of a frame 26 of the vehicle 28. The front bar 14 is centrally positioned across the width of the vehicle 28 and oriented generally perpendicular to the frame 26 of the vehicle 28.

The bottom end 22 of the rear bar 16 is fixedly coupled to the frame 26 of the vehicle 28 and positioned between the cab 30 and a forward section 33 of a bed 32 of the vehicle 28. The rear bar 16 is centrally positioned across the width of the vehicle 28 and oriented generally perpendicular to the frame 26 of the vehicle 28.

The top bar 18 is attached to and extends between each of the top ends 20 of the front and rear bars 14, 16. Each of the top ends 20 of the front and rear bars 14, 16 are positioned above the cab 30 such that the top bar 18 is positioned generally adjacent a top section 36 of the cab 30.

A front pulley member 38 is rotatably coupled to the front bar 14 and positioned adjacent to the top end 20. A rotational axis of the front pulley member is oriented substantially parallel to a vertical plane of the support structure 12.

A rear pulley member 40 is rotatably coupled to the rear bar 16 and positioned generally adjacent to the top end 20. A rotational axis of the rear pulley member 40 is oriented substantially parallel to a vertical plane of the support structure 12.

A coupler 42 is fixedly coupled to the forward section 33 of the bed 32 and is centrally positioned adjacent to a bottom edge 44 of the forward section 33.

A pair of support members 46 is fixedly coupled to a bottom surface 48 of a rear section 50 of the bed 32 and is positioned generally adjacent to the outside edges 52 of the bed 32. Each of the support members 46 are pivotally coupled to a rear portion 54 of the frame 26 of the vehicle 28 such that the bed 32 is pivotable between a raised position 56 and a lowered position 58.

A lifting means 60 that has a drum portion 62 is fixedly coupled to the front portion 24 of the frame 26 of the vehicle 28 and is positioned adjacent the bottom end 22 of the front bar 14. The lifting means 60 is electrically coupled to a battery 64 of the vehicle 28.

A cable 66 for raising and lowering the forward section 33 of the bed 32 has a first end 68 and a second end 70. The cable 66 is wound about the drum portion 62 of the lifting means 60 and abuts each of the pulley members. The first end 68 is attached to the drum portion 62 of the lifting means 60. The second end 70 is attached to the coupler 42.

When the lifting means 60 rotates in a first direction 72 the cable 66 is wound about the drum portion 62 and the forward section 33 of the bed 32 is pivotally moved toward the raised position 56.

When the lifting means 60 rotates in a second direction 73 the cable 66 is unwound from the drum portion 62. The forward section 33 of the bed 32 is pivotally moved toward the lowered position 58.

An actuator 74 for controlling the lifting means 60 is positioned in the cab 30 of the vehicle 28. The actuator 74 is electrically coupled between the lifting means 60 and the battery 64 of the vehicle 28.

In a secondary embodiment, the support structure 12 comprises a single support bar 76 centrally positioned across the width of the vehicle 28 between the cab 30 and the front portion 24 of the bed 32 of the vehicle 28. The lifting means 60 is positioned adjacent a bottom end 22 of the support bar, and a single pulley member 78 is positioned adjacent the top end 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A truck bed dumping system for converting a vehicle having a bed positioned behind a cab of the vehicle into a dump truck, said system comprising:

a support structure having a front bar, a rear bar, and a top bar, each of said front and rear bars having a top end and a bottom end;

a front pulley member being rotatably coupled to said front bar and positioned adjacent to said top end;

a rear pulley member being rotatably coupled to said rear bar and positioned generally adjacent to said top end;

a coupler being fixedly coupled to the forward section of the bed and being centrally positioned adjacent to a bottom edge of the forward section;

a pair of support members being fixedly coupled to a bottom surface of a rear section of the bed and being positioned generally adjacent to outside edges of the bed;

a lifting means having a drum portion being fixedly coupled to the front portion of the frame of the vehicle and positioned adjacent said bottom end of said front bar;

a cable for raising and lowering the forward section of the bed having a first end and a second end, said cable being wound about said drum portion of said lifting means and abutting each of said pulley members;

wherein when said lifting means rotates in a first direction said cable is wound about said drum portion and the forward section of the bed is pivotally moved toward a raised position;

wherein when said lifting means rotates in a second direction said cable is unwound from said drum portion, the forward section of the bed is pivotally moved toward a lowered position; and an actuator for controlling said lifting means being positioned in the cab of the vehicle.

2. The truck bed dumping system as set forth in claim 1, further comprising said bottom end of said front bar being fixedly coupled to the front portion of the frame of the vehicle, said front bar being centrally positioned across the width of the vehicle and oriented generally perpendicular to the frame of the vehicle.

3. The truck bed dumping system as set forth in claim 1, further comprising said bottom end of said rear bar being fixedly coupled to the frame of the vehicle and positioned between the cab and the forward section of the bed, said rear bar being centrally positioned across the width of the vehicle and oriented generally perpendicular to the frame of the vehicle.

4. The truck bed dumping system as set forth in claim 1, further comprising said top bar being attached to and extending between each of said top ends of said front and rear bars, each of said top ends of said front and rear bars being positioned above the cab such that said top bar is positioned generally adjacent a top section of the cab.

5. The truck bed dumping system as set forth in claim 1, further comprising a rotational axis of said front pulley member being oriented substantially parallel to a vertical plane of said structure.

6. The truck bed dumping system as set forth in claim 1, further comprising a rotational axis of said rear pulley member being oriented substantially parallel to a vertical plane of said structure.

7. The truck bed dumping system as set forth in claim 1, further comprising each of said support members being pivotally coupled to a rear portion of the frame of the vehicle such that the bed is pivotable between the raised position and the lowered position.

8. The truck bed dumping system as set forth in claim 1, further comprising said lifting means being electrically coupled to a battery of the vehicle.

9. The truck bed dumping system as set forth in claim 1, further comprising said first end of said cable being attached to said drum portion of said lifting means, said second end of said cable being attached to said coupler.

10. The truck bed dumping system as set forth in claim 1, further comprising said actuator being electrically coupled between said lifting means and the battery of the vehicle.

11. A truck bed dumping system for converting a vehicle having a bed positioned behind a cab of the vehicle into a dump truck, said system comprising:

a structure having a front bar, a rear bar, and a top bar, each of said front and rear bars having a top end and a bottom end, said bottom end of said front bar being fixedly coupled to a front portion of a frame of the vehicle, said front bar being centrally positioned across the width of the vehicle and oriented generally perpendicular to the frame of the vehicle, said bottom end of said rear bar being fixedly coupled to the frame of the vehicle and positioned between the cab and a forward section of the bed, said rear bar being centrally positioned across the width of the vehicle and oriented generally perpendicular to the frame of the vehicle, said top bar being attached to and extending between each of said top ends of said front and rear bars, each of said top ends of said front and rear bars being positioned above the cab such that said top bar is positioned generally adjacent a top section of the cab;

a front pulley member being rotatably coupled to said front bar and positioned adjacent to said top end, a rotational axis of said front pulley member being oriented substantially parallel to a vertical plane of said structure;

a rear pulley member being rotatably coupled to said rear bar and positioned generally adjacent to said top end, a rotational axis of said rear pulley member being oriented substantially parallel to a vertical plane of said structure;

a coupler being fixedly coupled to the forward section of the bed and being centrally positioned adjacent to a bottom edge of the forward section;

a pair of support members being fixedly coupled to a bottom surface of a rear section of the bed and being positioned generally adjacent to outside edges of the bed, each of said support members being pivotally coupled to a rear portion of the frame of the vehicle such that the bed is pivotable between a raised position and a lowered position;

a lifting means having a drum portion being fixedly coupled to the front portion of the frame of the vehicle and positioned adjacent said bottom end of said front bar, said lifting means being electrically coupled to a battery of the vehicle;

a cable for raising and lowering the forward section of the bed having a first end and a second end, said cable being wound about said drum portion of said lifting means and abutting each of said pulley members, said first end being attached to said drum portion of said lifting means, said second end being attached to said coupler, wherein when said lifting means rotates in a first direction said cable is wound about said drum portion and the forward section of the bed is pivotally moved toward said raised position, wherein when said lifting means rotates in a second direction said cable is unwound from said drum portion, the forward section of the bed is pivotally moved toward said lowered position; and an actuator for controlling said lifting means being positioned in the cab of the vehicle, said actuator being electrically coupled between said lifting means and the battery of the vehicle.

\* \* \* \* \*